(12) United States Patent
Yamaguchi et al.

(10) Patent No.: US 6,664,495 B2
(45) Date of Patent: Dec. 16, 2003

(54) THERMAL CUTTING MACHINE AND DUST COLLECTING METHOD THEREOF

(75) Inventors: Yoshihiro Yamaguchi, Kaga (JP); Tetsuya Kabata, Kaga (JP)

(73) Assignee: Komatsu Industries Corp., Tokyo (JP)

( * ) Notice: Subject to any disclaimer, the term of this patent is extended or adjusted under 35 U.S.C. 154(b) by 0 days.

(21) Appl. No.: 10/266,805

(22) Filed: Oct. 8, 2002

(65) Prior Publication Data

US 2003/0080096 A1 May 1, 2003

(30) Foreign Application Priority Data

Oct. 30, 2001 (JP) ........................................ 2001-333555

(51) Int. Cl.[7] ................................................ B23K 9/00
(52) U.S. Cl. ............................ 219/121.39; 219/121.48; 219/121.58
(58) Field of Search .................... 219/121.39, 121.58, 219/121.48, 121.6, 121.67; 266/65, 49; 83/451, 167; 454/7; 126/622, 629, 628, 286; 372/107

(56) References Cited

U.S. PATENT DOCUMENTS 4,063,059 A * 12/1977 Brolund et al. ............... 219/68
4,067,556 A * 1/1978 Lagerwall et al. ............ 266/65
6,165,410 A * 12/2000 Crees et al. ................... 266/49
6,320,153 B1 * 11/2001 Hulings et al. .......... 219/121.39

FOREIGN PATENT DOCUMENTS

| JP | 51-42841 | 4/1976 |
| JP | 52-32343 | 8/1977 |
| JP | 60-43231 B2 | 9/1985 |
| JP | 2-87591 U | 7/1990 |
| JP | 5-9760 U | 2/1993 |

* cited by examiner

Primary Examiner—Teresa Walberg
Assistant Examiner—Quang Van
(74) Attorney, Agent, or Firm—Frishauf, Holtz, Goodman & Chick, P.C.

(57) ABSTRACT

A thermal cutting machine and a dust collecting method capable of reducing in size and exhausting fumes and a high pressure gas efficiently. For this purpose, the thermal cutting machine includes a plurality of exhaust chambers (20) which are placed side by side inside a table (3), an exhaust port (23) provided at one end side of each of the exhaust chambers, an exhaust device (25) communicating with each of the exhaust ports, an opening and closing drive device (24*b*) for opening and closing each of the exhaust ports, an air blow port (21) provided at a position substantially opposing each of the exhaust ports, an air blow device (22) which blows air into the each air blow port (21), and a control device (6) for controlling the opening and closing drive device and the air blow device in synchronism with each other, or controlling them individually, correspondingly to a horizontal position of a torch (4) which is under cutting operation.

8 Claims, 8 Drawing Sheets

F I G. 5
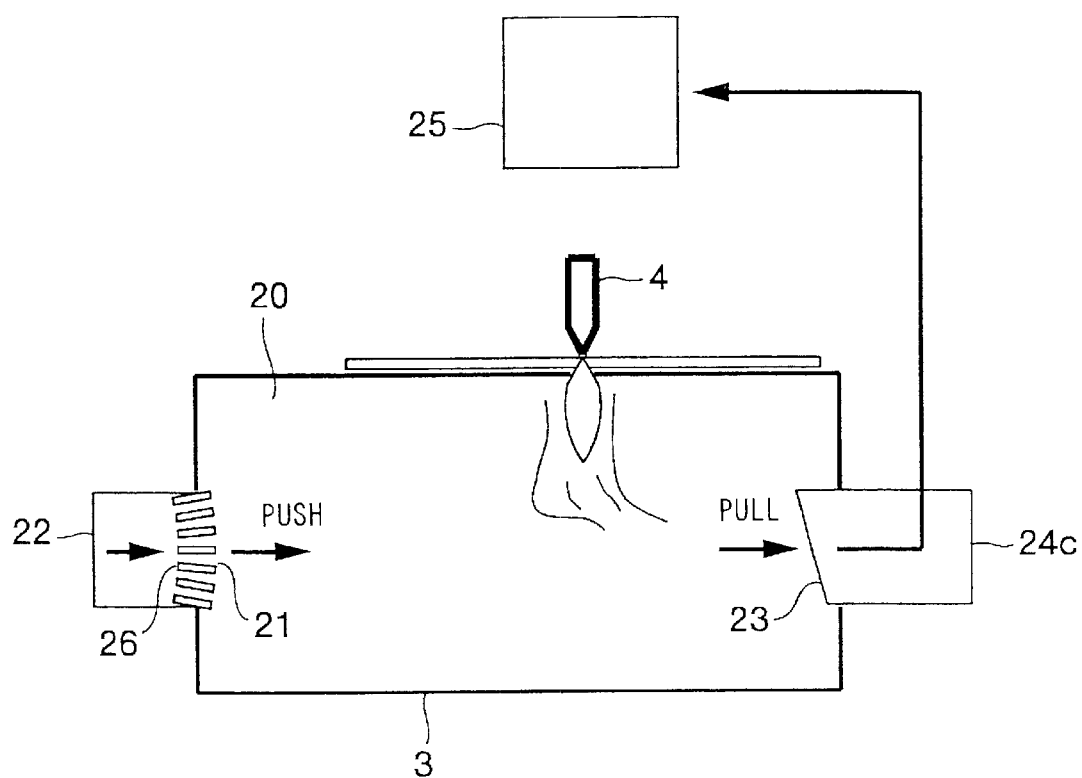

THERMAL CUTTING MACHINE AND DUST COLLECTING METHOD THEREOF

TECHNICAL FIELD

The present invention relates to a thermal cutting machine including a dust collector and a dust collecting method thereof.

BACKGROUND ART

Conventionally, when a metal plate material (hereinafter, called a workpiece) is thermally cut with plasma arc or laser light, fumes and a high pressure gas (hereinafter, called a flue gas) occur from a back surface of the cut material, and deteriorate the working environment in a factory, and therefore various arts of effectively collecting the flue gas are developed.

For example, Japanese Utility Model Laid-open No. 51-42841 discloses the constitution in which i) a cutting table is divided into small chambers, and branch exhaust pipes, which have openable and closable valve mechanisms in the respective small chambers and communicate with a dust collector for filtering out powder dust via a main exhaust pipe, and ii) means for opening only the branch exhaust pipe in the small chamber in which a plasma torch performs cutting, correspondingly to the position of the plasma torch, which is under cutting operation, are provided. It is described that this constitution makes it possible to collect dust intensively and effectively only in the small chamber where a flue gas is caused by plasma cutting.

Japanese Patent Application Publication No. 52-32343 discloses the art of dividing a cutting table into small chambers, including a limit switch for detecting the position of a plasma torch under cutting operation, and opening only a damper in the small chamber where the plasma torch is performing cutting operation. It is described that the above-described constitution makes it possible to collect dust intensively and effectively only in the small chamber where a flue gas is caused by the plasma cutting.

Japanese Patent Application Publication No. 60-43231 discloses the art of a comparatively large-sized plasma cutting machine provided with a gas duct partitioned perpendicularly to the moving direction of a carriage loaded with a plasma torch, a set of suction hood and blast hood mounted on the carriage and each faced to the aforementioned gas duct of the cutting table, and a dust collector mounted on the carriage. According to this constitution, the suction hood provided at the carriage moves together with the torch, and therefore the conventional dampers required in the respective small chambers become unnecessary, which makes the structure simple and low in cost. In addition, it has the effects of improving dust collecting efficiency by compulsory circulation by an air current from the blast hood to the suction hood, and the like.

Japanese Utility Model Laid-open No. 2-87591 discloses the art of providing a set of an intake system and an exhaust system at positions sandwiching fumes, a combustion gas and the like, which occur during laser beam machining, sending the fumes, the combustion gas and the like with the intake system at one side to the exhaust system at the other side, which discharges them outside the laser machine. It is described that this constitution improves exhaust efficiency.

According to Japanese Utility Model Laid-open No. 5-9760, as shown in FIG. 8, in a plasma machine including a flue gas chute 32 under a torch 31, air blow pipes 33 are placed at the upper edge of a chute 32. The above Laid-opened Utility Model has the constitution in which the air blow pipes 33 has a plurality of discharge holes 35 which discharge air inside the air blow pipes 33 into the chute 32 and form air curtains in a space between the outer edge of a workpiece 34 and an inner edge of the opening of the chute 32. According to the above constitution, a dust collector of the plasma machine, which is capable of absorbing and collecting a flue gas occurring during plasma machining such as cutting or welding at high efficiency, is disclosed.

However, the aforementioned conventional dust collecting apparatuses have the following problems.

(1) In the first and second prior arts disclosed in Japanese Utility Model Laid-open No. 51-42841 and Japanese Patent Application Publication No. 52-32343, the method of only sucking and discharging a flue gas into and from the exhaust chamber inside the table is adopted in each case, thus providing low exhaust efficiency. Above all, the fumes occurring during plasma cutting are very small powders of the order of $\mu$m floating in a high-temperature gas, and since its specific gravity is lighter than air at room temperature, it rises in the air. Accordingly, when cutting is performed at the position in the vicinity of the exhaust port, fumes are immediately sucked into the exhaust port, thus causing no problem. However, when it is performed at the position away from the exhaust port, the problem that the fumes spread along the back surface of a workpiece and leak out of a space between the workpiece and the table along the edge of the workpiece arises, as it also becomes the problem in Japanese Utility Model Laid-open No. 5-9760 that is previously described as the prior art. The size of the workpiece is not always the same as that of the table, but some workpieces are smaller with respect to the table, and in this case, the space becomes larger, thus causing the disadvantage that the dust collecting efficiency reduces and the amount of leaking fumes is increased.

(2) In the third prior art described in Japanese Patent Application Publication No. 60-43231, the dust collector, the blast hood and the suction hood are mounted on the carriage, which is originally provided for moving the plasma torch. As a result, a large carriage is required, and it is only proven in a large-sized plasma cutting machine called a gantry type (for example, the table with its machining area in size of 3 m×12 m). However, in comparatively small-sized plasma cutting machines which are generally produced in volume (for example, the table with its machining area in size of 1.5 m×3 m), it is difficult to provide the dust collector, the blast hood and the suction hood at the carriages in terms of space, and no example of its utilization is found at present.

In the third prior art, the exhaust gas including fume occurring in the gas duct is purified by the dust collector, and is directly used from the dust collector as push air (air is sent to the gas duct inside the table). This method is a simple method, since no device for push air is required. However, an exhaust gas in plasma cutting is at high temperature, and if it is used as push air, an upward current occurs because of the specific gravity being small. Even if the push air is blown toward the exhaust port, fumes escape upward, thus causing the problem that the recovery efficiency is low. Further, in the third prior art, the blast hood and the suction hood are provided at the carriage which moves. Consequently, when a cutting operation in which the carriage is sent at high speed is performed, the blast hood and the suction hood are moved to the next section in the state in which fumes remain in the section of the table, thus causing the disadvantage that the residual fumes leak out of the machine.

(3) The fourth prior art described in Japanese Utility Model Laid-open No. 2-87591 discloses the art of the method for pushing a flue gas into the exhaust chamber with the air blow device in a laser machine, and sucking and exhausting the flue gas with the exhaust system (hereinafter, called a push-pull method). However, the cutting table is not divided, and the exhaust chamber is not divided into a plurality of exhaust chambers, the entire cutting table has to be exhausted, thus requiring a large-sized dust collector with a strong suction force. Since the exhaust chamber is not divided into a plurality of exhaust chambers in the fourth prior art, the exhaust chamber necessarily becomes large, and the sectional area changes sharply among the air blow port and the exhaust port facing each other, and the exhaust chamber between them, thus causing disturbance in the current of the exhaust gas inside the exhaust chamber to cause an eddy and stagnation. Accordingly, a favorable dust collecting effect cannot be obtained.

(4) The fifth prior art described in Japanese utility Model Laid-open No. 5-9760 has the constitution in which push air (air curtain) is blown out of the air blow port provided in the vicinity of the surrounding of the workpiece toward the center, then becomes a downward current in the center of the workpiece while wrapping up fumes therein, and is sucked into the exhaust port. Due to a complicated flow of the current like this, an eddy and stagnation occur in the cutting table, and therefore, it cannot be said that the dust collection efficiency is good. When cutting machining is performed for such a workpiece as is small with respect to the table, the space between the table and the air blow port becomes large, thus causing the problem that the dust collecting efficiency is reduced and the amount of the fumes leaking out of the space is increased.

SUMMARY OF THE INVENTION

The present invention is made in view of the above-described disadvantages, and has its object to provide a thermal cutting machine and a dust collecting method thereof, which is applicable to a compact table type thermal cutting machine, and capable of efficiently discharging a flue gas occurring during thermal cutting and keeping the working environment inside a factory favorable.

In order to attain the above-described object, a first aspect of the thermal cutting machine according to the present invention has a constitution including, in a thermal cutting machine for thermally cutting a workpiece placed on a table from above by means of a torch movable in substantially a horizontal direction, a plurality of exhaust chambers which are separated by at least one partition plate provided in substantially parallel with one side of the table, and are placed side by side inside the table, an exhaust port provided at one end side in an exhaust direction of each of the exhaust chambers, exhaust means, which is provided at each of the exhaust ports, communicates with the each exhaust port via an exhaust duct shared by each of the exhaust ports or an individual exhaust passage, and performs exhaust of the each exhaust chamber, opening and closing drive means for opening and closing each of the exhaust ports, an air blow port provided at a side of the other end of each of the exhaust chambers and at a position substantially opposing each of the exhaust ports, air blow means which communicates with an inlet side of each of the air blow ports and blows air into the each air blow port; and control means for controlling each of the opening and closing drive means and each of the air blow means provided at both end sides of each of the exhaust chambers in synchronism with each other, or controlling them individually, correspondingly to a horizontal position of the torch which is under cutting operation.

According to the above constitution, the flue gas occurring at the under surface side of the workpiece during cutting operation enters only the exhaust chamber corresponding to the position of the torch out of a plurality of exhaust chambers provided to be separated each other inside the table. Air blow and exhaust for the exhaust chamber corresponding to the position of the torch are performed via the exhaust port and the air blow port provided to oppose each other in an exhaust direction. In this situation, the air blow means for blowing air into each of the air blow ports and the opening and closing drive means for opening and closing the exhaust route individually provided between each of the exhaust ports and the exhaust means are synchronously controlled or individually controlled based on the horizontal position of the torch. As a result, the flue gas in the exhaust chamber where the flue gas occurs from the lower part of the workpiece at the position of the torch during thermal cutting is sent to the exhaust port with a current of air caused by the air blow means in the exhaust chamber. Thus, suction exhaust can be performed extremely effectively with the exhaust means without causing disturbance of the current such as an eddy and stagnation. Accordingly, so-called ideal push pull ventilation is performed, and thus leakage of a flue gas out of the machine can be drastically reduced.

A second aspect of the thermal cutting machine according to the present invention has a constitution including, in the above-described first constitution, means for air blow including an individual air blow duct provided at an inlet side of each of the air blow ports, one air blow device which blows air into each of the air blow ports via each of the air blow ducts, and air blow opening and closing means, which is provided at each of the air blow ducts, and performs air blow and stops air blow, in place of the air blow means of the above-described first constitution. According to this constitution, the same operational effects as the above-described first constitution can be obtained.

Further, in the thermal cutting machine, each of the air blow means (or each of the air blow opening and closing means) may be capable of blowing air into only one of the aforementioned exhaust chambers that is provided with the each air blow means (or each air blow opening and closing means), via one of the air blow ports communicating therewith.

According to this constitution, the air blow means (or each of the air blow opening and closing means) is capable of blowing air into only one of the exhaust chambers. As a result, the air blow means can be operated in good timing so as to blow air into only the exhaust chamber where a flue gas is exhausted, and therefore ideal push pull ventilation is performed, thus making it possible to ventilate with reliability in a short time, and improve ventilation efficiency. In addition, the air blow means (or each of the air blow opening and closing means) can be operated in good timing when necessary, thus causing no disadvantages of blowing air into the exhaust chamber when the exhaust port is closed or the exhaust means is not operated, and raising the flue gas accumulated on the bottom of the exhaust chamber to leak it out of the machine.

Further, it may be suitable to adopt a constitution in which each of the exhaust ports is provided at a side nearer to a machine origin of movement of the torch than each of the air blow ports substantially opposed thereto, in the thermal cutting machine.

As described above, the flue gas floating in a high-temperature gas rises because its specific gravity is small. Accordingly, when cutting is performed at the position near the exhaust port, the flue gas is immediately sucked into the exhaust port, but when the workpiece is small and is not large enough to cover the top surface of the exhaust chamber, the flue gas away from the exhaust port tends to spread along the under surface of the workpiece and leak out of a space between the workpiece and the table. Thus, in the above-described constitution, the exhaust port is constructed to be provided at the machine origin of the torch movement. As a result, when the workpiece is smaller with respect to the table, the workpiece is placed at the side of the machine origin of the table in many cases, and therefore the top surface of the exhaust chamber at the side of the exhaust port is covered with the workpiece. Consequently, the space between the workpiece and the upper edge of the table can be substantially eliminated, thus dramatically improving dust collecting efficiency and making it possible to drastically reduce the amount of a flue gas leaking therefrom.

A first aspect of the dust collecting method of the thermal cutting machine includes, in a dust collecting method of a thermal cutting machine for collecting a flue gas occurring when thermally cutting a workpiece placed on a table from above by means of a torch movable in substantially a horizontal direction, the steps of detecting a horizontal position of the torch when performing cutting operation, and controlling each of air blow means and each of opening and closing drive means, which are provided to oppose each other with the torch between them, in synchronism with each other or individually, for each of a plurality of exhaust chambers which are separated in substantially parallel with one side of the table and are provided side by side inside the table to perform exhaust of a flue gas inside the exhaust chamber corresponding to the detected horizontal position of the torch, based on the detected horizontal position of the torch.

The above method is the method corresponding to the above-described first constitution of the thermal cutting machine. Namely, according to the method, the flue gas, which occurs from the lower part of the workpiece where the torch under cutting operation is located during thermal cutting, is sent to the exhaust port side with an air current caused by the air blow means in the exhaust chamber corresponding to the torch position out of a plurality of the exhaust chambers which are the separated rooms. Then, the flue gas is exhausted via the opening and closing drive means of the exhaust chamber, which is controlled synchronously with the air blow means or controlled individually, and therefore suction exhaust can be performed extremely efficiently without causing a disturbance of a current such as an eddy and stagnation. As a result, so-called ideal push-pull ventilation is performed and therefore leakage of the flue gas to an outside of the machine can be drastically reduced.

A second aspect of a dust collecting method of a thermal cutting machine according to the present invention includes, in a dust collecting method of a thermal cutting machine for collecting a flue gas occurring when thermally cutting a workpiece placed on a table from above by means of a torch movable in substantially a horizontal direction, the steps of detecting a horizontal position of the torch when performing cutting operation, performing air blow and exhaust for an exhaust chamber corresponding to the horizontal position of the torch out of a plurality of exhaust chambers which are separated in substantially parallel with one side of the table and are provided side by side inside the table, and after the torch passes the exhaust chamber corresponding to the horizontal position of the torch, continuing air blow and exhaust for the exhaust chamber corresponding to the horizontal position of the torch for a predetermined period of time to perform exhaust of a flue gas inside the table.

According to the above method, air blow and exhaust for the exhaust chamber is also continued for the predetermined period of time for the exhaust chamber after the torch under cutting operation passes it. As a result, in the case in which flue gas tends to remain in the exhaust chamber such as in the case of torch movement at the time of high-speed cutting or high-speed torch movement after completion of cutting, the flue gas remaining, in the exhaust chamber can be completely exhausted, and as a result, the effect of making it possible to perform exhaust of the flue gas of the entire inside part of the table completely can be obtained.

BRIEF DESCRIPTION OF THE DRAWINGS

FIG. 5 is an explanatory view of an outline of a push-pull dust correcting system of the thermal cutting machine according to the present invention;

BEST MODE FOR CARRYING OUT THE INVENTION

A preferred embodiment of the present invention will be explained in detail with reference to FIG. 1 to FIG. 8.

Figure 1:
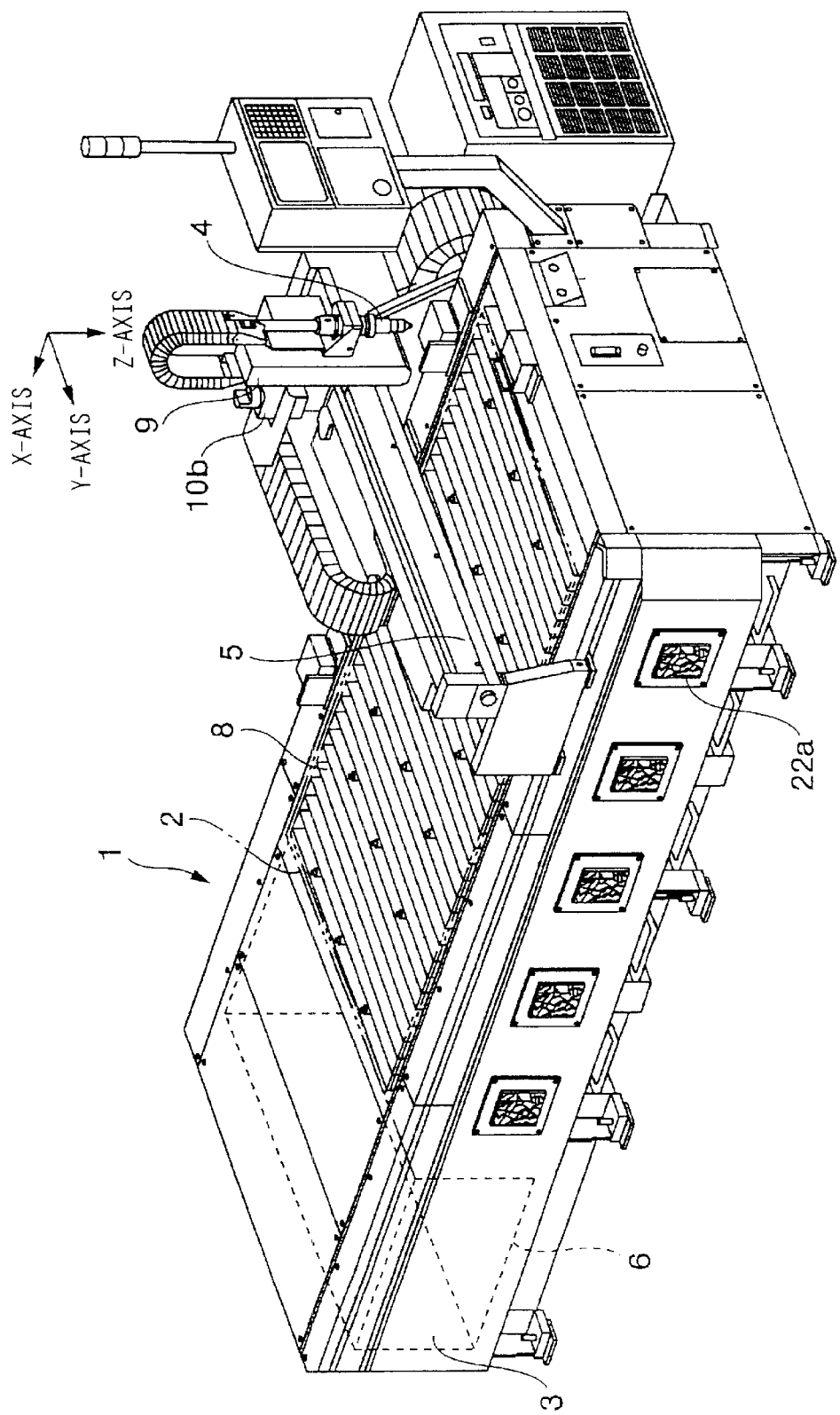
FIG. 1 is a perspective view of a thermal cutting machine according to the present invention.

FIG. 1 shows a perspective view of a plasma machine 1 as an example of a thermal cutting machine according to the present invention. The plasma machine 1 includes a table 3 for supporting a workpiece 2 and collecting a flue gas occurring from an underside surface of the workpiece 2 during cutting to keep a working environment clean, and a Y-axis carriage 5 travelable in an X-axis direction and travelable in a Y-axis direction. The plasma machine 1 also includes a Z-axis carriage 9, which is placed on the Y-axis carriage 5, holds a torch 4 that injects plasma arc, makes the torch 4 movable in a Z-axis direction that is in a perpendicular direction to the workpiece 2, has a function of keeping a distance between the torch 4 and the workpiece 2 (called stand-off) at predetermined height suitable for cutting, and is travelable in the Y-axis direction.

The X-axis, the Y-axis and Z-axis are equipped with an X-axis servo motor 10a, Y-axis servo motor 10b and a Z-axis servo motor 10c respectively, which are controlled by a NC controller as control means 6, and perform a predetermined operation. The control means 6 controls the servo motors 10a and 10b to move on an XY plane so as to cut the workpiece 2 into a previously determined shape, whereby shape cutting is performed. As for the Z-axis direction, even when the workpiece 2 is thermally deformed and warped during cutting, the stand-off is detected according to arc voltage, and the Z-axis servo motor 10c is controlled so as to keep the stand-off between the torch 4 and the workpiece 2 at a fixed suitable value, whereby favorable cutting is realized.

Figure 2:
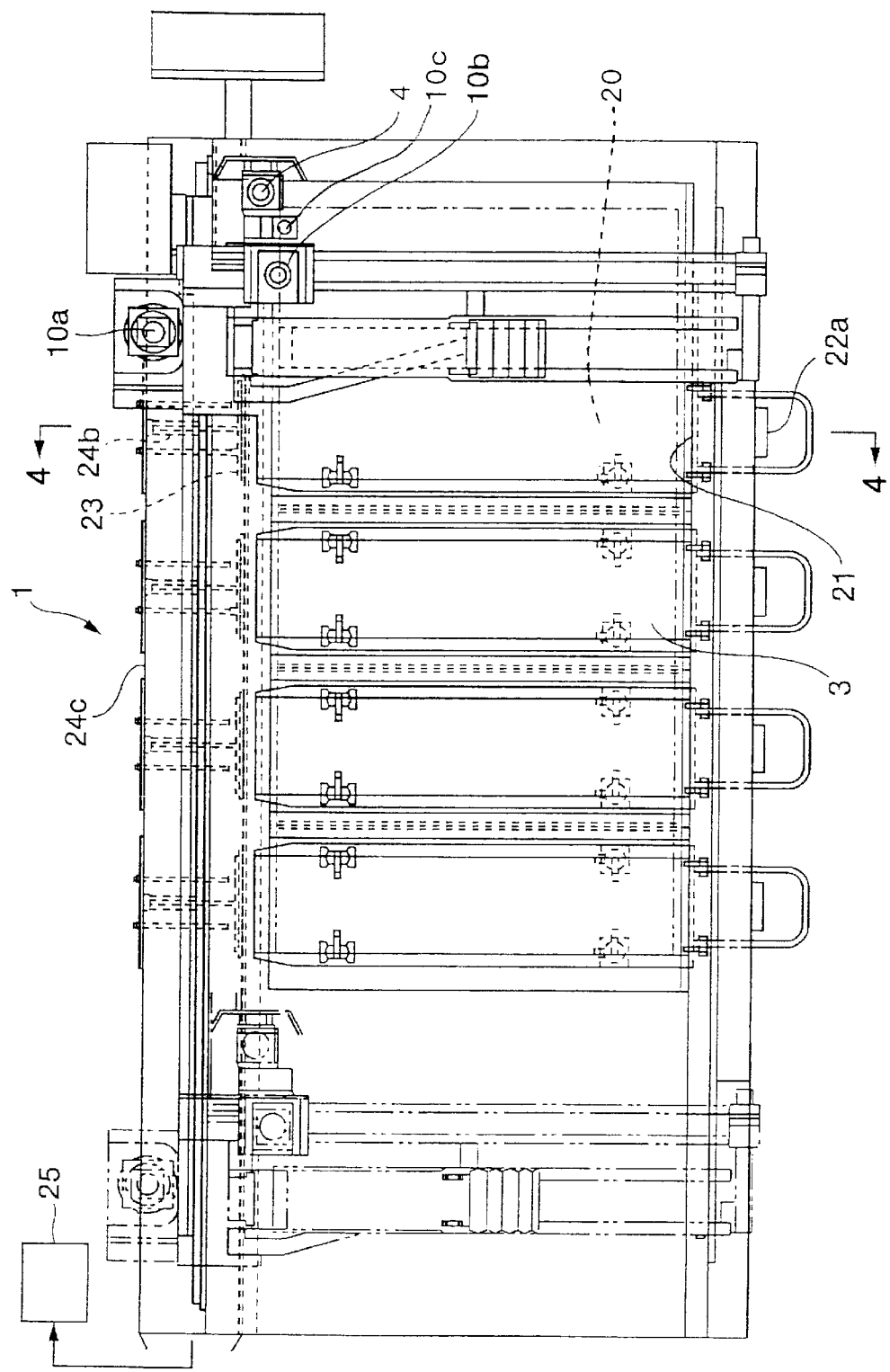
FIG. 2 is a plan view of the thermal cutting machine according to the present invention, and is the view seen in the arrow 2—2 in FIG. 4.
Figure 3:
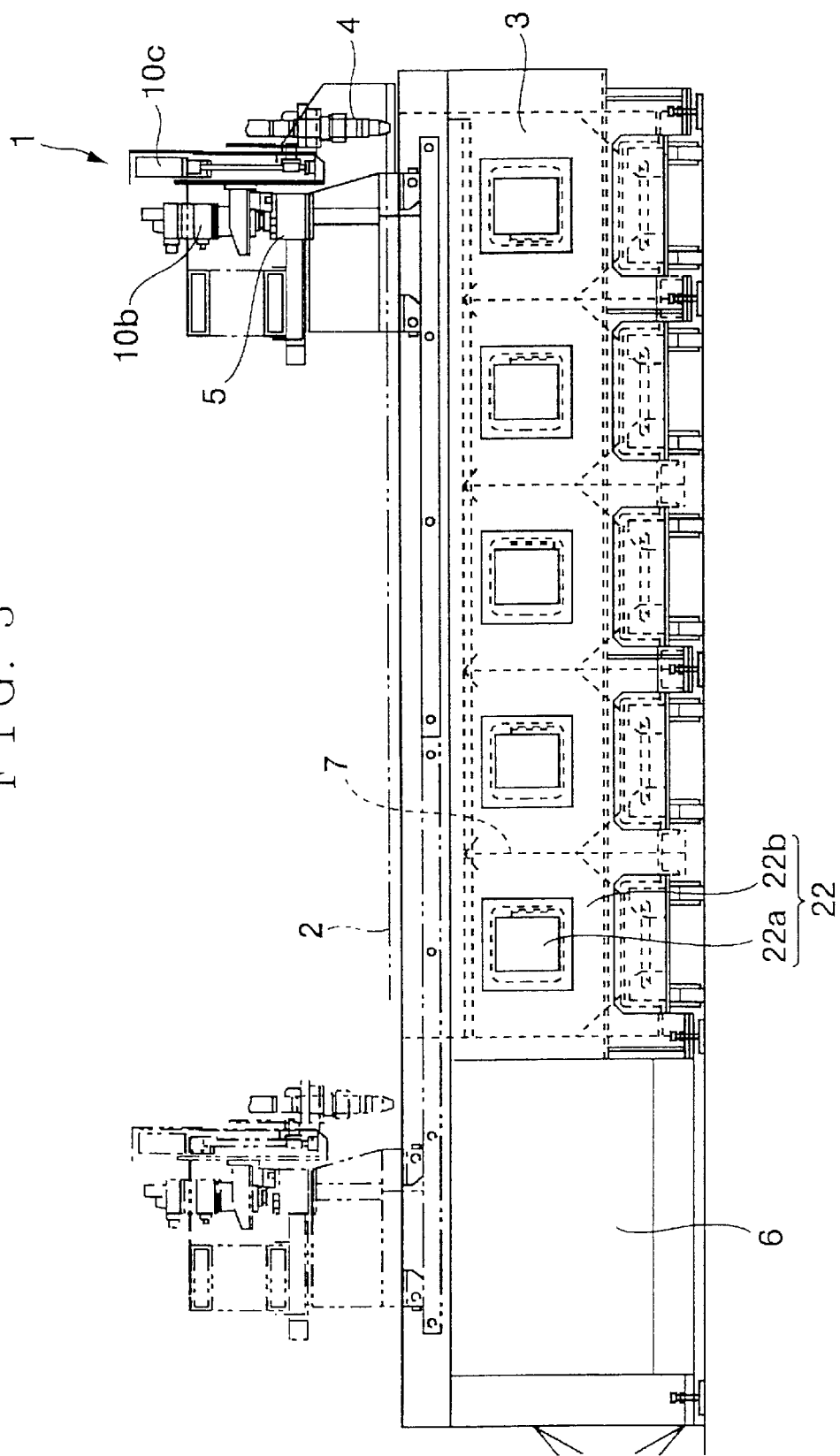
FIG. 3 is a side view of a thermal cutting machine according to the present invention.
Figure 4:
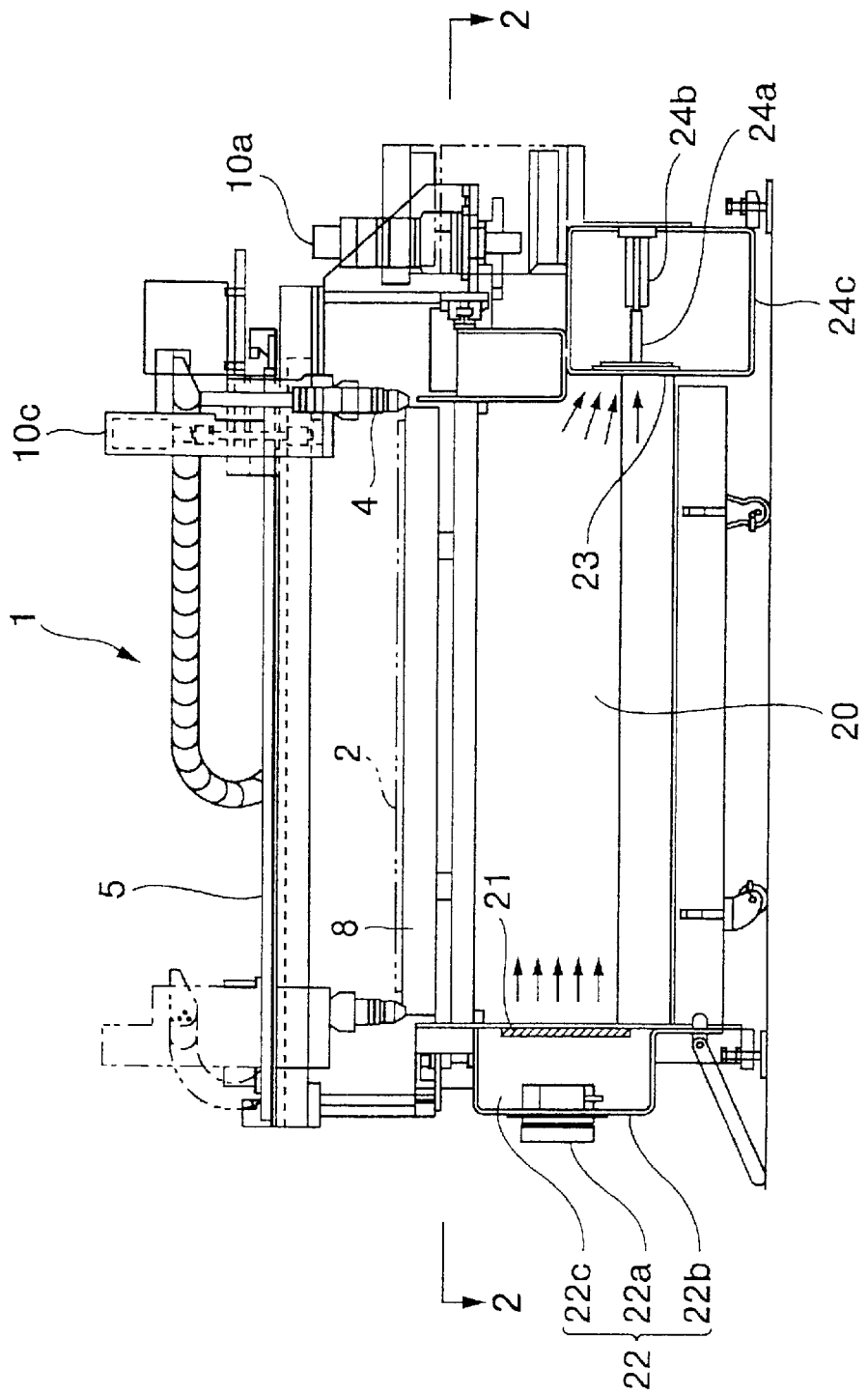
FIG. 4 is a rear view of the thermal cutting machine according to the present invention, and shows a section taken along the line 4—4 in FIG. 2.

FIG. 2 is a sectional plan view of the thermal cutting machine according to the present invention, and is a view seen in the direction of the arrow 2—2 in FIG. 4. FIG. 3 is a side view of the thermal cutting machine according to the present invention, FIG. 4 is a rear view of the thermal cutting machine according to the present invention, and is a sectional view taken along the line 4—4 in FIG. 2.

In FIGS. 2 to 4, the table 3 includes a workpiece supporting plate 8, on an upper part of which, the workpiece 2 is placed. A space inside the table 3 located under the workpiece supporting plate 8 is divided into a plurality of cubicle exhaust chambers 20 by partition plates 8 provided in parallel with one side of the table 3 (in this embodiment, a short side of the table 3). Each of the exhaust chambers 20 is provided with an exhaust port 23 for sucking a flue gas and an air blow port 21 for blowing a current (push air) toward the exhaust port 23. The exhaust port 23 of each of the exhaust chambers 20 communicates with one (namely, shared) exhaust duct 24c placed at one side face of the table 3. The exhaust duct 24c is connected to a dust collector (exhaust means) 25 for filtering out a flue gas containing fume with a filter (not shown).

The exhaust port 23 is provided with opening and closing means 24a driven by opening and closing drive means 24b (air cylinder in this embodiment) at the side of its outlet port. As shown in FIG. 4, by extending and contracting the opening and closing drive means 24b, the opening and closing means 24a opens and closes the exhaust port 23. An air blow chamber 22c covered with a cover 22b is formed at an outer side of the air blow port 21 of each of the exhaust chambers 20, and an electric fan 22a, which takes in outside air and sends push air into the air blow chamber 22c, is attached to each of the covers 22b.

According to the test carried out by the inventors, it was found out that in the plasma cutting machine 1, it is more effective to blow push air uniformly over a cross section of the exhaust chamber 20 as shown in FIG. 5, not push air in a form of a curtain as described in Japanese Utility Model Laid-open No. 5-9760 being the prior art. According to the result, it was found out that it is desirable to provide a current plate 26 at a downstream side of the electric fan 22a and between the air blow chamber 22c and the exhaust chamber 20 in order to blow push air into the exhaust chamber 20 as a uniform current. In FIG. 5, the current plate 26 is a louver, but the other forms like mesh and punching metal are also effective as the current plate. The electric fan 22a, the cover 22b, the air blow chamber 22c, the current plate 26 and the like constitute the air blow means 22.

Next, an operation will be explained.

The electric fan 22a and the opening and closing drive means 24b of each of the exhaust chamber 20 is controlled to be interlocked with the movement of the torch 4. A position in an X-axis direction of the torch 4 (the Y-axis carriage 5) is inputted into the control means 6 from an X-axis position sensor (not shown) mounted on the X-axis servo motor 10a. Based on the inputted X-axis position, the control means 6 outputs drive signals for the respective chambers corresponding to the inputted X-axis position, and by this drive signals, the electric fan 22a and the opening and closing drive means 24b are interlocked with the movement in the X-axis direction of the torch 4. As another control to interlock the electric fan 22a and the opening and closing drive means 24b with each other, a limit switch is pressed on in correspondence to the movement of the Y-axis carriage 5 in the X-axis direction, and thereby the position of the torch 4 is mechanically detected, and the control may be performed based on this position.

As for interlocking timing of the movement of the torch 4, and the electric fan 22a and the opening and closing drive means 24b, at first, the electric fan 22a and the opening and closing drive means 24b of the exhaust chamber 20, at which the torch 4 under cutting operation is located, are operated to be activated. Namely, the electric fan 22a is turned on, and the opening and closing drive means 24b is operated to open. During this operation, it is not preferable to inactivate the electric fan 22a and the opening and closing drive means 24b of the exhaust chamber 20, which is adjacent to the exhaust chamber 20 where the torch 4 is now located and the torch 4 passed at the immediately preceding time (namely, the electric fan 22a and the opening and closing drive means 24b that were being activated until the immediately preceding time) at the same time when the torch 4 passes the exhaust chamber 20 (namely, the electric fan 22a is stopped, and the opening and closing drive means 24b is operated to close), but it is preferable to inactivate them a predetermined time later. This is for the purpose of completely exhausting a flue gas, because the flue gas remains in the exhaust chamber 20 even after the torch 4 passes it. As a guideline of the above-described predetermined time, it is preferable to set the guideline at a time obtained by dividing a distance between the air blow port 21 and the exhaust port 23 by a wind velocity value of push air, namely, about a time taken for the push air coming out of the air blow port 21 to reach the exhaust port 23.

The control to supply push air only to the exhaust chamber 20 where the opening and closing drive means 24b is opened, or to supply it only to the exhaust chamber 20 where exhausting means 25 exhausts a gas is desirable. The reason is that if push air is supplied to the exhaust chamber 20 where exhaust operation is not performed, there arises the fear that dust particles are raised and the dust particles are blown out of the machine. When there is not so much raising of dust particles by push air and the amount of the push air is small, all of the air blow may be performed by one operation without performing the control of the blow of push air individually. This makes individual controls of the air blow means unnecessary and makes it possible to reduce cost.

Figure 6:
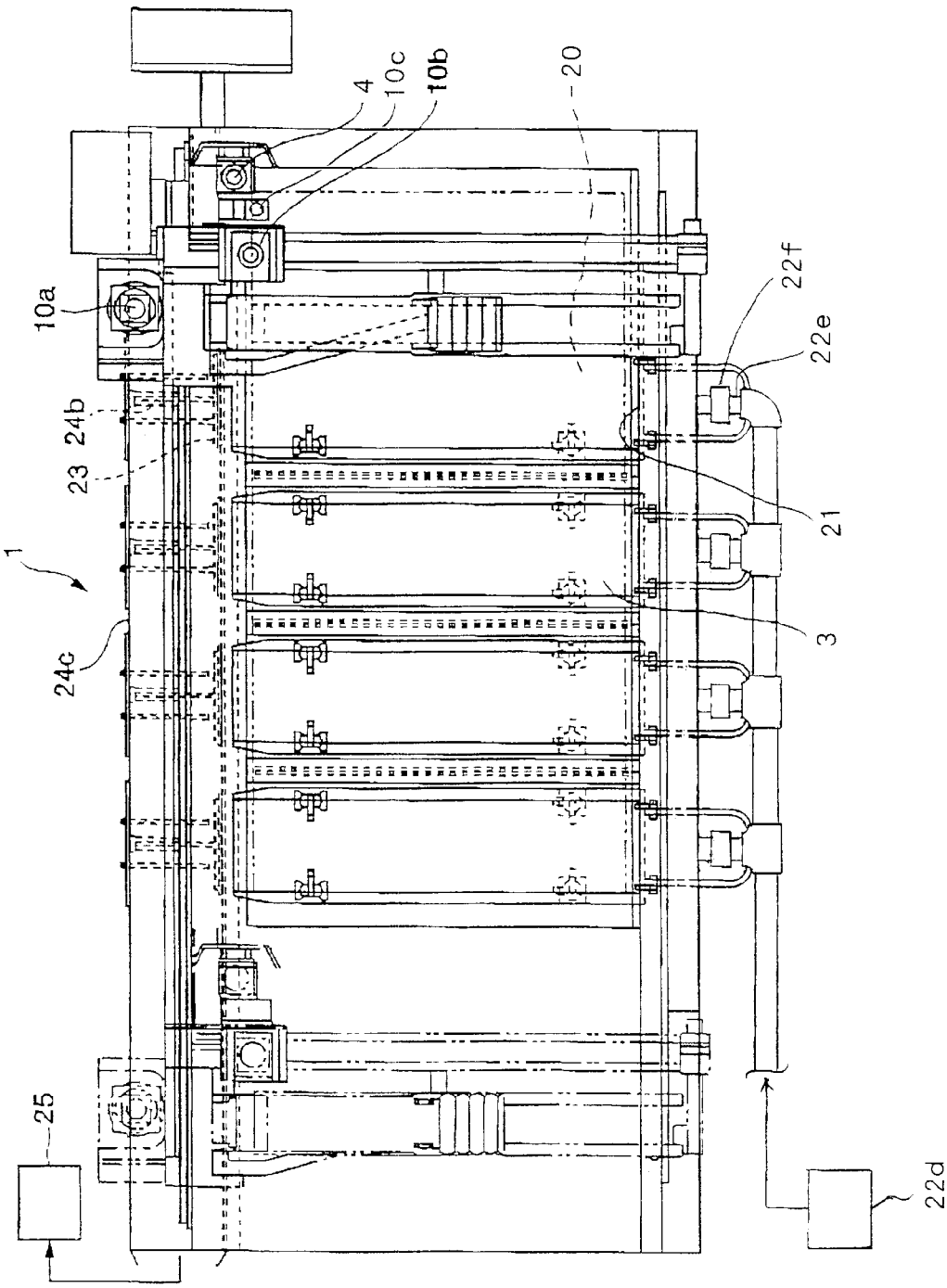
FIG. 6 is a plan view showing another constitution example near an air blow port of the thermal cutting machine according to the present invention.

Further, in the above-described embodiment, the electric fan 22a is provided at each of the exhaust chambers 20, but this is not restrictive. For example, as shown in FIG. 6, as push air, the constitution, in which one large-sized air blow device (for example, an electric fan, blower and the like) 22d is provided, and push air is distributed from the air blow device 22d to each of the air blow ports 21 via an air blow duct (or a pipeline or the like) individually provided thereat, may be suitable. In this situation, it is preferable to provide air blow opening and closing means 22f which performs air blow and stops air blow by being controlled synchronously with the opening and closing drive means 24b or by being controlled individually. Each of the air blow opening and closings means 22f may be provided at each of the air blow ports 21. By opening and closing the air blow opening and closing means 22f, it becomes possible to blow air into only one of the exhaust chambers 20 via each of the air blow ports with one large-sized air blow device 22d.

Figure 7:
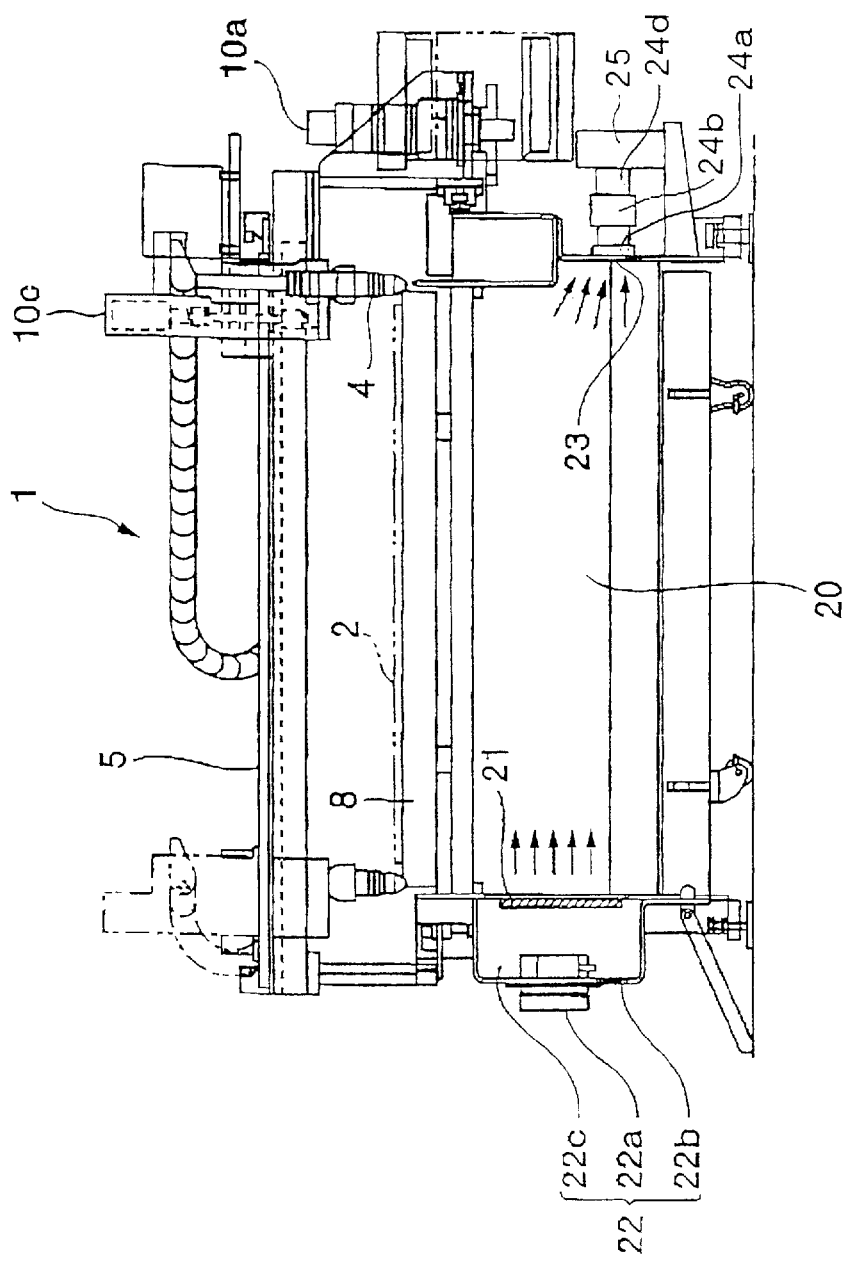
FIG. 7 is a rear view showing another constitution example near an exhaust port of the thermal cutting machine according to the present invention.
Figure 8:
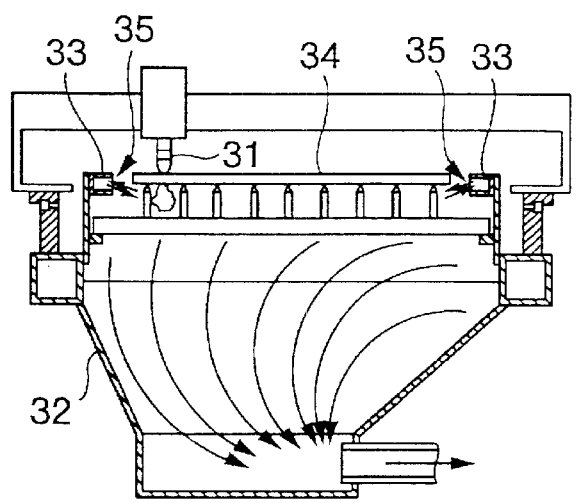
FIG. 8 is a sectional view of an essential part of a flue gas chute of a plasma machine according to a prior art.

In the above-described embodiment, the respective exhaust ports 23 communicate with one shared exhaust duct 24c, but it is not restrictive. For example, as shown in FIG. 7, it may be suitable to adopt the constitution in which each of the exhaust ports 23 is connected to the dust collector (exhaust means) 25, which filters out a flue gas containing fumes with a filter (not shown), via an individual exhaust passage 24d provided at the exhaust side.

As for the placement of the air blow port 21 and the exhaust port 23 of this embodiment, the exhaust port 23 is set at the side near the origin of the table 3 (the origin position of the movement of the torch 4, and the positions of the torch 4 shown in FIG. 1, FIG. 2 and FIG. 4). The reason of this will be explained below. In the plasma cutting machine 1, not only the large workpiece 2 corresponding to the entire surface of the table 3 is placed, but also the workpieces 2 smaller than the table 3 are frequently cut. In such cases, the workpiece 2 is normally placed at the side of the origin of the table 3, and in this situation, a space occurs between an upper edge of the table 3 and the workpiece 2, in other words, a large opening is made on the upper part of the exhaust chamber 20. However, in this embodiment, the air blow port 21 is placed at the opposite side from the origin, and the exhaust port 23 is placed at the side of the origin, whereby a flue gas does not leak out of the above-described opening, and dust can be collected extremely effectively.

As explained thus far, the following effects are provided according to the present invention.

(1) The present invention has the constitution in which in the thermal cutting machine, a plurality of exhaust chambers are provided inside the table, each of the exhaust chambers is provided with the exhaust port communicating with the exhaust means and the air blow port communicating with the air blow means so as to oppose the exhaust direction, and the control means, which synchronously controls or individually controls the opening and closing drive means of each of the exhaust ports and each of the air blow means based on the position of the torch under cutting operation, is included. Consequently, the flue gas inside the exhaust chamber, where the torch under cutting operation is located and the flue gas occurs from the lower part of the workpiece, can be forced into (push) the exhaust port with the air blow means, and can be sucked (pull) from the exhaust port via the opening and closing drive means with the exhaust means. As a result, so-called ideal push-pull ventilation, in which the gas can be exhausted extremely effectively without causing a disturbance of a current such as an eddy and stagnation, is performed, and thus leakage of the fumes outside the machine can be drastically reduced. Further, since the ventilation efficiency is high, it is possible to reduce the size of the dust corrector (exhaust means).

(2) Since the electric fan is individually provided at each of the air blow ports as the air blow means, the electric fan can be operated in good timing correspondingly to only the exhaust chamber, where fumes occur, to blow air, and thus ideal and efficient push-pull ventilation is carried out. The electric fan is operated in good timing when it is necessary, thus causing no disadvantage of blowing air into the exhaust chamber while the opening and closing means is closed and the exhaust port is closed, or when the exhaust means is not operated, and of raising the flue gas accumulated at the bottom of the exhaust chamber to let it leak out of the machine.

(3) Since the constitution in which the exhaust port is provided at the side of the origin of the machine of the movement of the torch is adopted, in the case of a smaller workpiece with respect to the table, the top surface of the exhaust chamber at the side of the origin of the machine, namely, at the side of the exhaust port, is covered with the workpiece. As a result, the space between the workpiece and the upper edge of the table near the exhaust port is substantially eliminated, and therefore dust correcting efficiency is dramatically enhanced, and the amount of the flue gas leaking outside can be drastically reduced.

(4) Air blow and exhaust of the exhaust chamber are also continued for the exhaust chamber for a predetermined period of time until a predetermined signal is obtained by the control means after the torch under cutting operation passes the exhaust chamber. Thus, even in the case in which a flue gas is more likely to remain in the exhaust chamber, such as the case of torch movement at the time of high-speed cutting, or the case of high-speed torch movement after the completion of cutting, the flue gas remaining in the exhaust chamber is completely exhausted, and as a result, the enormous effect of making it possible to perform exhaust of the flue gas in the entire inner side of the table can be obtained.

(5) Since it is not necessary to provide the torch carriage with a blast hood, a suction hood, a dust collector (exhaust means) and the like, the invention is also applicable to thermal cutting machines having compact tables.

(6) The air from the air blow means such as an electric fan or the like is temporarily stored in the air blow chamber 22c, and the air is further shaped by the shape plate 26 and blown from the air blow chamber 22c to the exhaust chamber 20, thus making it possible to blow push air uniformly and widely over the cross sectional surface inside the exhaust chamber 20, and making it possible to push the flue gas into the exhaust port with reliability.

What is claimed is:

1. A thermal cutting machine for thermally cutting a workpiece placed on a table from above by means of a torch movable in substantially a horizontal direction, comprising:

a plurality of exhaust chambers which are separated by at least one partition plate provided in substantially parallel with one side of said table, and are placed side by side inside said table;

an exhaust port provided at one end side in an exhaust direction of each of said exhaust chambers;

exhaust means, which is provided at each of said exhaust ports, communicates with said each exhaust port via an exhaust duct shared by each of said exhaust ports or an individual exhaust passage, and performs exhaust of said each exhaust chamber;

opening and closing drive means for opening and closing each of said exhaust ports;

an air blow port provided at a side of the other end of each of said exhaust chambers and at a position substantially opposing each of said exhaust ports;

air blow means which communicates with an inlet side of each of said air blow ports and blows air into said each air blow port; and control means for controlling each of said opening and closing drive means and each of said air blow means provided at both end sides of each of said exhaust chambers in synchronism with each other, or controlling them individually, correspondingly to a horizontal position of said torch which is under cutting operation.

2. The thermal cutting machine according to claim 1, wherein each of said air blow means is capable of blowing air into only one of said exhaust chambers that is provided with said each air blow means via one of said air blow ports communicating therewith.

3. The thermal cutting machine according to claim 1, wherein each of said exhaust ports is provided at a side nearer to a machine origin of movement of said torch than each of said air blow ports substantially opposed thereto.

4. A thermal cutting machine for thermally cutting a workpiece placed on a table from above by means of a torch movable in substantially a horizontal direction, comprising:

a plurality of exhaust chambers which are separated by at least one partition plate provided in substantially parallel with one side of said table, and are placed side by side inside said table;

an exhaust port provided at one end side in an exhaust direction of each of said exhaust chambers;

exhaust means, which is provided at each of said exhaust ports, communicates with said each exhaust port via an exhaust duct shared by each of said exhaust ports or an individual exhaust passage, and performs exhaust of said each exhaust chamber;

opening and closing drive means for opening and closing each of said exhaust ports;

an air blow port provided at a side of the other end of each of said exhaust chambers and at a position substantially opposing each of said exhaust ports;

an air blow device which communicates with an inlet side of each of said air blow ports via an individual air blow duct provided thereto and blows air into said each air blow port;

air blow opening and closing means which is provided at each of said air blow duct, and performs and stops air blow; and control means for controlling each of said opening and closing drive means and each of said air blow opening and closing drive means provided at both end sides of each of said exhaust chambers in synchronism with each other, or controlling them individually, correspondingly to a horizontal position of said torch which is under cutting operation.

5. The thermal cutting machine according to claim 4, wherein each of said air blow opening and closing means is capable of blowing air into only one of said exhaust chambers that is provided with said each air blow opening and closing means, via one of said air blow ports communicating therewith, by being operated to open.

6. The thermal cutting machine according to claim 4, wherein each of said exhaust ports is provided at a side nearer to a machine origin of movement of said torch than each of said air blow ports substantially opposed thereto.

7. A dust collecting method of a thermal cutting machine for collecting a flue gas occurring when thermally cutting a workpiece placed on a table from above by means of a torch movable in substantially a horizontal direction, comprising the steps of:

detecting a horizontal position of said torch while performing cutting operation; and controlling each of air blow means and each of opening and closing drive means, which are provided to oppose each other with said torch between them, in synchronism with each other or individually, for each of a plurality of exhaust chambers which are separated in substantially parallel with one side of said table and are placed side by side inside said table to perform exhaust of a flue gas inside the exhaust chamber corresponding to said detected horizontal position of the torch, based on said detected horizontal position of the torch.

8. A dust collecting method of a thermal cutting machine for collecting a flue gas occurring when thermally cutting a workpiece placed on a table from above by means of a torch movable in substantially a horizontal direction, comprising the steps of:

detecting a horizontal position of said torch while performing cutting operation;

performing air blow and exhaust for an exhaust chamber corresponding to said horizontal position of the torch out of a plurality of exhaust chambers which are separated in substantially parallel with one side of said table and are placed side by side inside said table; and after said torch passes the exhaust chamber corresponding to said horizontal position of the torch, continuing air blow and exhaust for the exhaust chamber corresponding to said horizontal position of the torch for a predetermined period of time to perform exhaust of a flue gas inside said table.

* * * * *